United States Patent Office 3,833,583
Patented Sept. 3, 1974

3,833,583
PERINONE DYESTUFFS
Dietmar Kalz, Cologne, and Gerhard Wolfrum, Opladen, Germany, assignors to Bayer Aktiengesellschaft, Leverkusen, Germany
No Drawing. Filed Apr. 21, 1971, Ser. No. 136,234
Claims priority, application Germany, Apr. 25, 1970, P 20 20 299.7
Int. Cl. C07d 51/48
U.S. Cl. 260—256.4 Q          3 Claims

ABSTRACT OF THE DISCLOSURE

Perinone dyestuff which is free from any sulphonic acid groups and corresponds to the general formula:

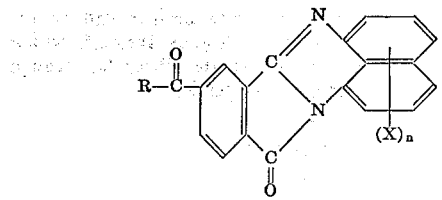

in which

R denotes a radical of an optionally substituted cyclic amine,
X stands for halogen, and
$n$ represents 0, 1 or 2 as well as their production and use for the dyeing and printing of hydrophobic fibre materials.

---

The subject-matter of the present invention comprises new perinone dyestuffs which are free from sulphonic acid groups and correspond to the formula

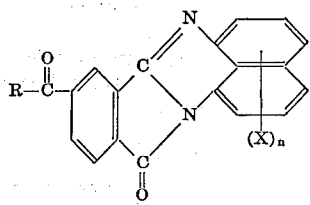

(I)

in which

R denotes the radical of a cyclic amine, X stands for halogen, and $n$ represents a number from 0 to 2, as well as their production and their use for the dyeing of hydrophobic fibre materials.

In formula (I), R preferably stands for radicals of 5- to 7-membered cyclic amines from the series of pyrrolidines, piperidines, hexamethylene-imines, morpholines, thiomorpholines and thiomorpholine dioxides. The radicals of these heterocycles may be substituted by halogen, $C_1$–$C_3$-alkyl or $C_1$–$C_3$-alkoxy groups. Suitable radicals R are, for example:

pyrrolidinyl, 2-methyl-pyrrolidinyl, 2-chloropiperidinyl, 2,6-dimethyl-piperidinyl, 2-ethoxy-piperidinyl, 2-methyl-morpholinyl, 3-methyl-thiomorpholinyl and others.

Chlorine and bromine are particularly suitable halogen atoms X.

The new dyestuffs (I) are obtained by reacting carboxylic acid halides of the formula (II)

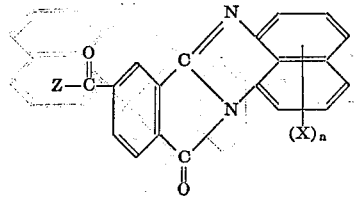

(II)

in which Z denotes a halogen atom, preferably chlorine, with cyclic amines, preferably in the presence of acid-binding agents and of anhydrous inert solvents, at elevated temperatures.

The carboxylic acid halides (II) used as starting material are known in part (see e.g. U.S. Patent Specification No. 3,342,818).

The acid halides (II) to be used according to the invention are obtained in known manner by condensing trimellitic acid or its functional derivatives, preferably the anhydride, with the appropriate 1,8-naphthylene-diamines in nitrobenzene, N-methyl-pyrrolidone or chlorinated aromatic hydrocarbons as solvents, at 80 to 240° C., preferably at 120–200° C., to form the free perinone-carboxylic acids, and converting the latter in the usual way by means of acid-halogenating agents, such as thionyl chloride or phosgene, into the corresponding acid halides (II).

Suitable 1,8-naphthylene-diamines are, for example, 1,8-naphthylene-diamine, 2-chloro-1,8-naphthylene-diamine, 2-bromo-1,8-naphthylene-diamine, 2,4-dichloro-1,8-naphthylene-diamine, 2,4 - dibromo-1,8-naphthylene - diamine.

The carboxylic acid halides (II) may be used in pure crystalline form; according to a particular method of execution, the process of the invention for the preparation of the dyestuffs (I) can also be carried out as a single pot reaction by converting the perinone-carboxylic acids in an inert solvent with, for example, $SOCl_2$ or $COCl_2$ into the acid chlorides and reacting the latter, without isolation and after driving off the volatile reaction products by means of dry air or pure nitrogen and possibly with the addition of acid acceptors, in the same vessel with the cyclic amines to be used according to the invention.

Suitable cyclic amines are, for example:

pyrrolidine,
3,4-dichloro-pyrrolidine,
3,4-dibromo-pyrrolidine,
2-methyl-pyrrolidine,
3-methyl-pyrrolidine,
2,3-dimethyl-pyrrolidine,
3,4-dimethyl-pyrrolidine,
2,5-dimethyl-pyrrolidine,
2-chloro-piperidine,
piperidine,
3-chloro-piperidine,
4-chloro-piperidine,
2-bromo-piperidine,
3-bromo-piperidine,
4-bromo-piperidine,
2-methyl-piperidine,
3-methyl-piperidine,
4-methyl-piperidine,
2-ethyl-piperidine,
3-ethyl-piperidine,
4-ethyl-piperidine,
2,4-dimethyl-piperidine,
2,5-dimethyl-piperidine,
2,6-dimethyl-piperidine,
2-methyl-5-ethyl-piperidine,
2-methoxy-piperidine,
3-methoxy-piperidine,
4-methoxy-piperidine,
2-ethoxy-piperidine,
3-ethoxy-piperidine,
4-ethoxy-piperidine,
hexamethylene-imine,
morpholine,
2-methyl-morpholine,
3-methyl-morpholine,
2,3-dimethyl-morpholine,
2,6-dimethyl-morpholine,
thiomorpholine, 2-methyl-thiomorpholine,
3-methyl-thiomorpholine,
2,3-dimethyl-thiomorpholine,
2,5-dimethyl-thiomorpholine,
2,6-dimethyl-thiomorpholine,
thiomorpholine dioxide,
2-methyl-thiomorpholine dioxide,
3-methyl-thiomorpholine dioxide,
2,3-dimethyl-thiomorpholine dioxide,
2,5-dimethyl-thiomorpholine dioxide,
2,6-dimethyl-thiomorpholine dioxide.

Suitable inert solvents are dioxan, toluene, tetraline, chlorobenzene, o-dichlorobenzene, trichlorobenzene, nitrobenzene, dimethyl-aniline, pyridine or quinoline.

Suitable acid-binding agents are sodium acetate, pyridine, picoline, quinoline, triethylamine and dimethylaniline.

The condensation temperatures may be varied within a fairly wide range. In general, the process is carried out at temperatures from 60 to 220° C., preferably at 50-120° C.

The procedure for preparing the new dyestuffs expediently consists in adding to a solution or suspension of an acid halide in a suitable anhydrous solvent, preferably in the presence of at least 1 equivalent of an acid acceptor, at temperatures of 60-100° C., dropwise at least about 1 equivalent of one of the aforesaid cyclic amines; then stirring for 1 to 3 hours at temperatures which may be raised to not more than 220° C.; evaporating part of the solvent in a vacuum, if desired; cooling to room temperature; filtering off the precipitated dyestuff with suction; washing with a little light petroleum or alcohol and then with water optionally containing a small amount of an emulsifier; and drying.

When the dyestuffs so obtained have been finely divided, they are eminently suitable for the dyeing and printing of hydrophobic synthetic fibre materials, such as polyester fibres, especially polyethylene terephthalate fibres or fibres of condensation products from bis-hydroxymethylcyclohexane and terephthalic acid, as well as fibres of cellulose triacetate or polyolefines and superpolyamides and -urethanes. They can also be used for the dyeing of polyester fibres according to the so-called thermosol process.

Dyeings of outstanding fastness properties, especially very good fastness to light, sublimation and rubbing, are obtained on the said materials according to the usual dyeing methods for these materials.

The parts given in the following Examples mean parts by weight.

Example 1

158 parts 1,8-naphthylene-diamine are mixed in 1000 parts 1,2,4-trichlorobenzene with 192 parts trimellitic acid anhydride and the mixture is heated at boiling temperature until 36 parts of water have distilled over via a distillation head. The mixture is then allowed to cool to about 160° C., and 119 parts thionyl chloride are added dropwise. The temperature is raised to boiling temperature, and the darkred reaction mixture is kept boiling under reflux for 2 hours. The heating is then turned off and a current of dry air is passed through the reaction mixture until the gaseous hydrochloric acid liberated in the course of the acid chloride formation has been driven off. The temperature of the reaction mixture is allowed to fall to 100° C.

150 parts piperidine are added dropwise, and stirring is continued at 100° C. for 2 hours. About 500 parts trichlorobenzene are then distilled off in a water jet vacuum, the residue after distillation is cooled to room temperature, and the precipitated dyestuff is filtered off with suction. The dyestuff is washed with light petrol and then with water to which 1-3% of an emulsifier have been added, and dried. The yield amounts to 305 g. of an orange-red dyestuff of the following constitution:

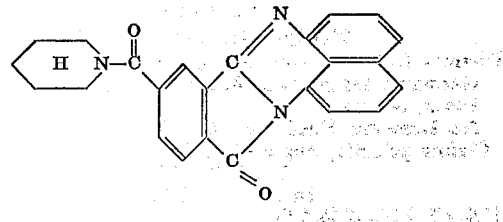

which, when finely divided, dyes polyester fibres by the usual dyeing methods in brilliant orange shades. The dyeings are characterised by outstanding fastness to light, very good fastness to sublimation and good fastness to rubbing.

Instead of pyridine, the following amines can be reacted in the same way to form analogous dyestuffs which likewise dye polyester or polyamide fibres in orange shades of very good fastness properties:

180 parts 2-methyl-pyrrolidine,
480 parts 3,4-dibromo-pyrrolidine,
260 parts 3-chloro-piperidine,
540 parts 2-bromo-piperidine,
200 parts 2-methyl-piperidine,
200 parts 4-methyl-piperidine,
240 parts 2,4-dimethyl-piperidine,
240 parts 2,5-dimethyl-piperidine,
240 parts 2,6-dimethyl-piperidine,
250 parts 2-methyl-5-ethyl-piperidine,
240 parts 4-methoxy-piperidine,
180 parts morpholine,
210 parts 2-methyl-morpholine,
240 parts 2,5-dimethyl-morpholine,
220 parts thiomorpholine,
240 parts 3-methyl-thiomorpholine,
270 parts 2,3-dimethyl-thiomorpholine,
280 parts thiomorpholine-dioxide,
310 parts 2-methyl-thiomorpholine-dioxide,
340 parts 2,5-dimethyl-thiomorpholine-dioxide,
210 parts hexamethylene-imine.

Example 2

158 parts 1,8-naphthylene-diamine are mixed in 1000 parts o-dichlorobenzene with 192 parts trimellitic acid anhydride, and the mixture is heated at boiling temperature until 36 parts of water have distilled over via a distillation head. The mixture is then allowed to cool to 160° C., 119 parts thionyl chloride are added dropwise, the temperature is raised to boiling point, and the mixture is kept boiling under reflux for 2 hours. 500 parts o-dichlorobenzene are then distilled off, the residue after distillation is cooled to room temperture, and the crystallized dark-red dyestuff carboxylic acid chloride is filtered off with suction, washed with light petrol and dried.

The acid chloride is heated in 2200 parts tetrachloroethylene to 80° C., mixed with 80 parts pyridine and 90 parts morpholine, and the mixture is boiled under reflux for 2 hours. It is then cooled to room temperature, the orange-red dyestuff is filtered off with suction, intensely washed with hot water, and dried. A dyestuff of the following constitution:

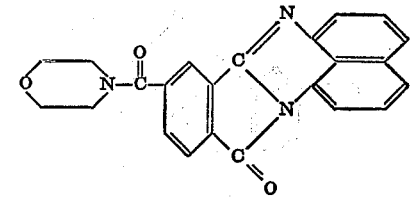

is obtained in a high yield; when finely divided, it dyes polyester fibres by the usual dyeing methods in brilliant orange shades. The dyeings are characterised by outstanding fastness to light, very good fastness to sublimation and good fastness to rubbing.

Example 3

The procedure described in Example 2 is followed, but the 1,8-naphthylene-diamine is replaced with its 2-chloro derivative (192.5 parts).

A dyestuff is obtained whose outstanding dyeing properties are similar to those of the dyestuffs described in Example 2.

Equally good results are achieved with the use of the following naphthylene-diamines: 237 parts 2-bromo-1,8-naphthylene-diamine, 227 parts 2,4-dichloro-1,8-naphthylene-diamine or 316 parts 2,4-dibromo-1,8-naphthylene-diamine.

Dyeing Example 25 parts of the orange dyestuff obtained according to Example 1 are ground with 75 parts of a condensation product from β-naphthalene-sulphonic acid and formaldehyde and with 120 parts of water in a ball mill for 24 hours. This paste is subsequently dried in a vacuum at 50° C. and the residue is finely ground.

1 part of this dyestuff powder is stirred into 2000 parts of hot water which contains 8–10 parts of a carrier, e.g. o-phenyl-phenol, and which has been adjusted to a pH value of appr. 4.5 with the aid of sulphuric acid. There is obtained a very fine dyestuff suspension into which 50 parts of polyester fibres are introduced at 40–60° C. The dyebath is heated to boiling temperature within 20 minutes and kept at the same temperature for 1 to 1½ hours. The dyed material is subsequently thoroughly rinsed with water and dried. A clear orange dyeing of outstanding fastness to light and very good fastness to sublimation and rubbing is obtained.

What we claim is:
1. Perinone dyestuff of the formula:

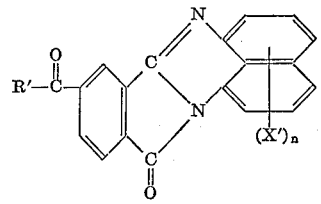

in which

R' is a member selected from the group consisting of pyrrolidino, piperidino, hexamethylene-imino, morpholino, thiomorpholino, thiomorpholino-dioxide, and any of such members substituted by $C_1$–$C_3$ alkyl, $C_1$–$C_3$ alkoxy, or halo;

X' is chloro or bromo; and $n$ is 0, 1 or 2.

2. Perinone dyestuff of Claim 1 in which R' is pyrrolidino, 2-methylpyrrolidino, 2-chloropiperidino, 2,6-dimethylpiperidino, 2 - ethoxypiperidino, 2 - methylmorpholino, or 3-methylthiomorpholino.

3. Perinone dyestuff of the formula:

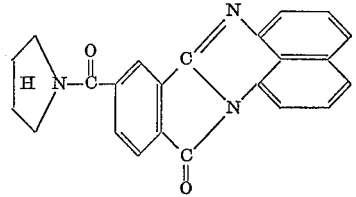

References Cited

UNITED STATES PATENTS 3,544,573   12/1970   Christmann _____ 260—256.4 Q

RICHARD J. GALLAGHER, Primary Examiner

U.S. Cl. X.R.

260—40, 243 R, 243 A, 247.2 A, 251 A